(12) United States Patent
Yamaguchi et al.

(10) Patent No.: US 7,039,516 B2
(45) Date of Patent: May 2, 2006

(54) BELT TYPE CONTINUOUSLY VARIABLE TRANSMISSION

(75) Inventors: Midori Yamaguchi, Yokohama (JP); Yoshihisa Kodama, Yokohama (JP); Masahiko Kikuchi, Atsugi (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 11/230,521

(22) Filed: Sep. 21, 2005

(65) Prior Publication Data
US 2006/0069486 A1 Mar. 30, 2006

(30) Foreign Application Priority Data
Sep. 24, 2004 (JP) ............................. 2004-278029

(51) Int. Cl.
*G06F 17/00* (2006.01)
(52) U.S. Cl. ............................. 701/51; 701/53; 701/54; 477/37; 477/44; 477/45; 477/46
(58) Field of Classification Search .................. 701/51, 701/53, 54, 55, 56, 58, 59; 477/37, 44, 45, 477/46; 474/6, 11, 12
See application file for complete search history.

(56) References Cited

U.S. PATENT DOCUMENTS

| | | | | |
|---|---|---|---|---|
| 5,419,128 A | * | 5/1995 | Asano et al. ............... | 60/327 |
| 5,812,050 A | * | 9/1998 | Figgins ..................... | 340/407.1 |
| 5,934,152 A | * | 8/1999 | Aschoff et al. ............. | 74/513 |
| 6,289,762 B1 | * | 9/2001 | Silva ......................... | 74/513 |
| 6,305,240 B1 | * | 10/2001 | Hannewald et al. ........ | 74/513 |
| 6,547,691 B1 | * | 4/2003 | Hino ......................... | 477/37 |
| 6,817,964 B1 | * | 11/2004 | Kayukawa et al. ......... | 477/15 |

FOREIGN PATENT DOCUMENTS

| | | |
|---|---|---|
| JP | 03-181659 A | 8/1991 |
| JP | 2004-092669 | 3/2004 |

* cited by examiner

*Primary Examiner*—Richard M. Camby
(74) *Attorney, Agent, or Firm*—Foley & Lardner LLP

(57) ABSTRACT

A belt type continuously variable transmission includes a primary pulley (11), a secondary pulley (12), a belt (13) wound around the primary pulley and secondary pulley; a sensor (27, 21) for detecting a vehicle running state; and a controller (1). The controller (1) is programmed to: set a final pulley ratio achieved by a shift of the pulley ratio of the primary and secondary pulleys, based on the vehicle running state, compute a primary steady oil pressure supplied to the primary pulley and a secondary steady oil pressure supplied to the secondary pulley based on an input torque inputted to the primary pulley and an actual pulley ratio, determine a target shift speed based on the final pulley ratio, compute a target stroke speed of the primary pulley and/or secondary pulley from the target shift speed, compute a target pulley rotation speed of the primary pulley, based on the vehicle running state, compute a transitional oil pressure correction amount which can attain the target shift speed, in response to the target pulley rotation speed and the target stroke speed, and set one of the oil pressure supplied to the primary pulley and the oil pressure supplied to the secondary pulley, to the sum of the steady oil pressure and the transitional oil pressure correction amount, so as to attain the final pulley ratio.

6 Claims, 14 Drawing Sheets

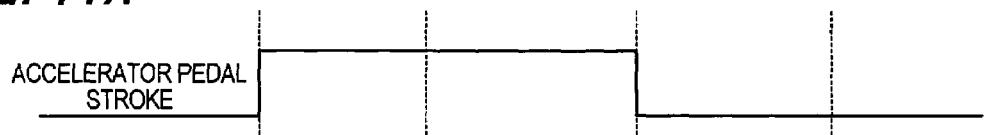
FIG. 11A ACCELERATOR PEDAL STROKE
FIG. 11B ACTUAL PULLEY RATIO
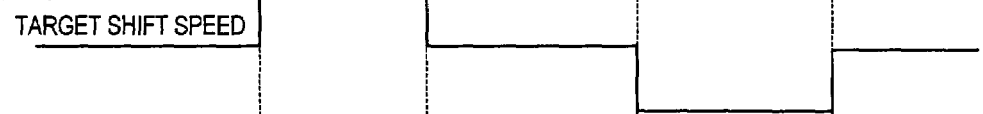
FIG. 11C TARGET SHIFT SPEED
FIG. 11D PRIMARY PULLEY PRESSURE
FIG. 11E SECONDARY PULLEY PRESSURE

BELT TYPE CONTINUOUSLY VARIABLE TRANSMISSION

FIELD OF THE INVENTION

This invention relates to improvement of a belt type continuously variable transmission (CVT) used for a power transmission system which transmits the rotation of an engine (prime mover) to the drive wheels of a vehicle.

BACKGROUND OF THE INVENTION

In the prior art, a belt type continuously variable transmission is sometimes used as a vehicle transmission. The belt type continuously variable transmission has a primary pulley which receives an engine rotation, a secondary pulley which outputs the rotation to drive wheels, and a V-belt for transmitting the rotation of the primary pulley to the secondary pulley. By adjusting the pulley ratio which is the ratio of the contact radius of the V belt relative to the primary pulley and secondary pulley (i.e. effective radius of the primary pulley and secondary pulley), the speed ratio of input and output rotation speed can be adjusted.

Tokkai Hei 03-181659 published by the Japan Patent Office in 1991 discloses an example of a control device for a belt type continuously variable transmission. The control device can improve controllability and can also easily cope with abnormalities. Due to this control device, a required primary pressure is computed based on the input torque and pulley ratio in a steady state (state where a fixed pulley ratio is maintained). An electrical signal of a target primary pressure according to a required primary pressure is inputted into a primary pulley control valve to control the primary pressure, and the pulley ratio is maintained by oil pressure. In a transient state (state where the pulley ratio is changing), the primary pressure is increased by the control valve of the primary pulley to perform an upshift, and the primary pressure is reduced to perform a down shift. However, since the primary pressure is decreased during a downshift, the torque capacity (maximum torque which can be transmitted) of the primary pulley may fall too much, and the belt may slip.

Tokkai 2004-92669 published by the Japan Patent Office in 2004 discloses a control device of the prior art for coping with this problem. Due to this device, in the steady state, a steady oil pressure which attains the present pulley ratio of the primary pulley and secondary pulley and the torque capacity of the belt, is supplied. During a downshift, a transitional oil pressure for attaining a target shift speed is applied to the secondary pulley to change the pulley ratio. A differential thrust required to vary the pulley ratio, is controlled according to the shift speed. (The term "differential thrust" is defined as the difference between the thrust required to steadily maintain a certain pulley ratio and a real thrust.) Hence, the pulley ratio is changed while the torque capacity of the pulley is always maintained, so the belt is prevented from slipping during a down shift.

SUMMARY OF THE INVENTION

In the prior art, the relation between a differential thrust required for pulley ratio change and a target shift speed of a pulley is not determined uniquely, but varies according to the rotation speed of the pulley. Therefore, it is necessary to take the scatter in the relation between the differential thrust and the target shift speed into consideration.

However, since the prior art disclosed by Tokkai 2004-92669 computes the differential thrust from the target shift speed of the pulley, the differential thrust is increased more than necessary when the pulley rotation speed is low. For this reason, the load of an oil pressure pump or the like increases, and fuel consumption is impaired.

It is therefore an object of this invention to provide a belt type continuously variable transmission in which the load of the oil pressure pump or the like is suppressed.

In order to achieve the above object, this invention provides a belt type continuously variable transmission, comprising: a primary pulley on an input side having a groove which varies according to an oil pressure; a secondary pulley on an output side having a groove which varies according to an oil pressure; a belt wound around the primary pulley and secondary pulley; detecting means for detecting a vehicle running state; pulley ratio setting means for setting a final pulley ratio achieved by a shift of the pulley ratio of the primary and secondary pulleys, based on the vehicle running state; steady oil pressure computing means for computing a primary steady oil pressure supplied to the primary pulley and a secondary steady oil pressure supplied to the secondary pulley, according to an input torque inputted to the primary pulley and an actual pulley ratio; target shift speed determining means for determining a target shift speed based on the final pulley ratio; target stroke speed computing means for computing a target stroke speed of the primary pulley and/or secondary pulley from the target shift speed; target pulley rotation speed computing means for computing a target pulley rotation speed of the primary pulley, based on the vehicle running state; transitional oil pressure computing means for computing a transitional oil pressure correction amount which can attain the target shift speed, in response to the target pulley rotation speed of the primary pulley and the target stroke speed; and oil-pressure control means for setting one of the oil pressure supplied to the primary pulley and the oil pressure supplied to the secondary pulley, to the sum of the steady oil pressure and transitional oil pressure correction amount, so as to attain the final pulley ratio.

This invention also provides a belt type continuously variable transmission, comprising: a primary pulley on an input side having a groove which varies according to an oil pressure; a secondary pulley on an output side having a groove which varies according to an oil pressure; a belt wound around the primary pulley and secondary pulley; a sensor for detecting a vehicle running state; and a controller. The controller is programmed to: set a final pulley ratio achieved by a shift of the pulley ratio of the primary and secondary pulleys, based on the vehicle running state, compute a primary steady oil pressure supplied to the primary pulley and a secondary steady oil pressure supplied to the secondary pulley based on an input torque inputted to the primary pulley and an actual pulley ratio, determine a target shift speed based on the final pulley ratio, compute a target stroke speed of the primary pulley and/or secondary pulley from the target shift speed, compute a target pulley rotation speed of the primary pulley, based on the vehicle running state, compute a transitional oil pressure correction amount which can attain the target shift speed, in response to the target pulley rotation speed and the target stroke speed, and set one of the oil pressure supplied to the primary pulley and the oil pressure supplied to the secondary pulley, to the sum of the steady oil pressure and the transitional oil pressure correction amount, so as to attain the final pulley ratio.

Further, this invention provides a control method for controlling a belt type continuously variable transmission, the transmission comprising: a primary pulley on an input side having a groove which varies according to an oil pressure; a secondary pulley on an output side having a groove which varies according to an oil pressure; and a belt wound around the primary pulley and secondary pulley. The control method comprises detecting a vehicle running state; setting a final pulley ratio achieved by a shift of the pulley ratio of the primary and secondary pulleys, based on the running state; computing a primary steady oil pressure supplied to the primary pulley and a secondary steady oil pressure supplied to the secondary pulley, according to an input torque inputted to the primary pulley and an actual pulley ratio; determining a target shift speed based on the final pulley ratio; computing a target pulley rotation speed of the primary pulley, based on the vehicle running state; computing a target stroke speed of the primary pulley and/or secondary pulley from the target shift speed; computing a transitional oil pressure correction amount which can attain the target shift speed, in response to the target pulley rotation speed and the target stroke speed; and setting one of the oil pressure supplied to the primary pulley and the oil pressure supplied to the secondary pulley, to the sum of the steady oil pressure and transitional oil pressure correction amount, so as to attain the final pulley ratio.

The details as well as other features and advantages of this invention are set forth in the remainder of the specification and are shown in the accompanying drawings.

BRIEF DESCRIPTION OF THE DRAWINGS

FIG. 11 is a time chart when there is a downshift when an accelerator pedal is depressed, and an upshift when the accelerator pedal is released. FIG. 11A shows the stroke of the accelerator pedal. FIG. 11B shows an actual pulley ratio. FIG. 11C shows a target shift speed. FIG. 11D shows an oil pressure supplied to the primary pulley. FIG. 11E shows an oil pressure supplied to the secondary pulley.

DESCRIPTION OF THE PREFERRED EMBODIMENTS

Figure 1:
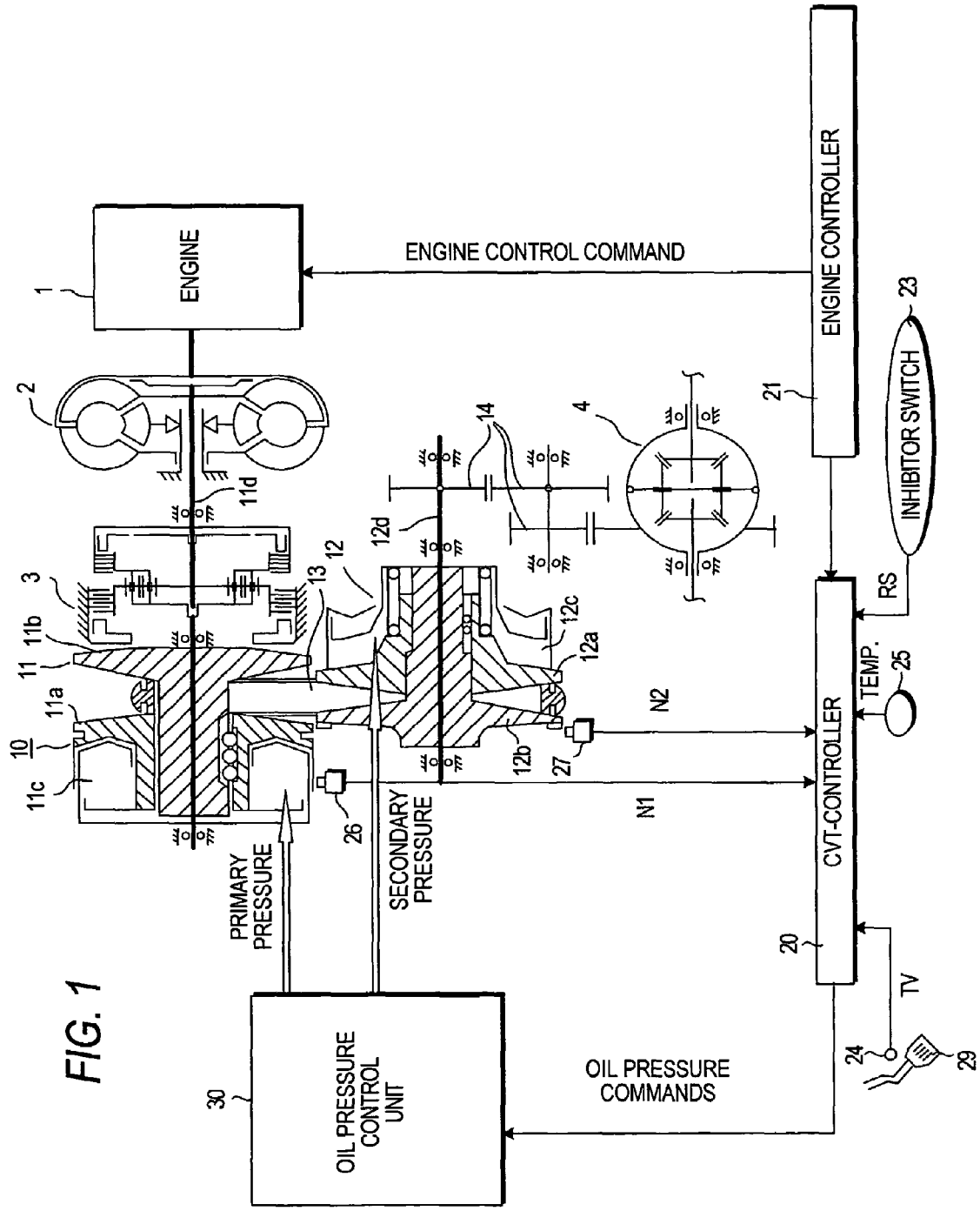
FIG. 1 is a schematic view showing one embodiment of a belt type continuously variable transmission according to the embodiments.

FIG. 1 is a schematic view showing one embodiment of a belt type continuously variable transmission according to this invention. The belt type continuously variable transmission is installed in a vehicle, but it is not limited thereto.

A belt type continuously variable transmission 10 comprises a primary pulley 11, secondary pulley 12, V-belt 13, CVT controller 20 and oil pressure control unit 30. The primary pulley 11 is a pulley on the input side which receives a rotation from the engine 1. The primary pulley 11 comprises a fixed conical plate 11b which rotates together with an input shaft 11d, and a movable conical plate 11a disposed opposite to this fixed conical plate 11b which forms a V-shaped pulley groove together with the fixed conical plate 11b. The movable conical plate 11a can be displaced in the direction of the input shaft by an oil pressure (primary pressure) which acts on a primary pulley cylinder chamber 11c. The primary pulley 11 is connected with the engine 1 via a forward/reverse change-over mechanism 3 and torque converter 2 provided with a lock-up clutch, and thus the rotation of the engine 1 is inputted into the primary pulley 11. The rotation speed N1 of the primary pulley 11 is detected by a primary pulley rotation speed sensor 26. A V-Belt 13 is wound around the primary pulley 11 and secondary pulley 12, and transmits the rotation of primary pulley 11 to the secondary pulley 12. The secondary pulley 12 outputs the rotation transmitted by the V-belt 13 to a differential 4. The secondary pulley 12 comprises a fixed conical plate 12b which rotates together with an output shaft 12d, and a movable conical plate 12a disposed opposite to this fixed conical plate 12b which forms a V-shaped pulley groove together with the fixed conical plate 12b. The movable conical plate 12a can be displaced in the direction of the output shaft according to an oil pressure (secondary pressure) which acts on the secondary pulley cylinder chamber 12c. The pressure-receiving area of the secondary pulley cylinder chamber 12c is set approximately equal to the pressure-receiving area of the primary pulley cylinder chamber 11c.

The secondary pulley 12 is connected with a differential 4 via an idler gear 14 and an idler shaft, and outputs a rotation to the differential 4. The rotation speed N2 of the secondary pulley 12 is detected by a secondary pulley rotation speed sensor 27. The vehicle speed can be computed from the rotation speed of the secondary pulley 12.

The CVT controller 20 determines the pulley ratio and contact frictional force based on signals from an inhibitor switch 23, accelerator stroke sensor 24, oil temperature sensor 25, primary pulley rotation speed sensor 26 and secondary pulley rotation speed sensor 27, and input torque data (i.e., engine torque data) from the engine controller 21. The engine controller 21 serves as an input torque sensor for detecting the input torque. A pulley ratio is a value obtained by dividing the effective radius of the secondary pulley 12 by the effective radius of the primary pulley 11, and is synonymous with the input/output speed ratio (N1/N2). The contact frictional force is a contact frictional force between the V-belt 13 and the pulleys 11, 12. The CVT controller 20 transmits a command to an oil pressure control unit 30, and controls the belt type continuously variable transmission 10.

An engine controller 21 comprises a microcomputer comprising a central processing unit (CPU), random-access memory (RAM), read only memory (ROM), input-and-output (I/O) interface and timer. The engine controller 21 transmits commands to control the engine 1, such as an ignition timing command, throttle opening command, and fuel injection amount command.

The oil pressure control unit 30 operates based on a command from the CVT controller 20. The oil pressure control unit 30 supplies an oil pressure to the primary pulley 11 and secondary pulley 12, and displaces the movable conical plate 11a and movable conical plate 12a back and forth along their respective rotation axes.

If the movable conical plate 11a and movable conical plate 12a displace, the pulley groove width will change and the V-belt 13 displace on the primary pulley 11 and secondary pulley 12. The contact radius of the V-belt 13 with the primary pulley 11 and secondary pulley 12 therefore changes, and the pulley ratio and contact frictional force of the V-belt 13 are thereby controlled.

The rotation of the engine 1 is inputted into the belt type continuously variable transmission 10 via the torque converter 2 and forward/reverse change-over mechanism 3, and is transmitted to the differential 4 via the V-belt 13 and secondary pulley 12 from the primary pulley 11.

If an accelerator pedal 29 is depressed or a shift change is performed in a manual mode, the movable conical plate 11a of the primary pulley 11 and movable conical plate 12a of the secondary pulley 12 respectively displace in the shaft direction, and the pulley ratio varies continuously. A shift change is produced when the position of a selector varies. The selector selects the operating range or operating mode of the belt type continuously variable transmission.

Figure 2:
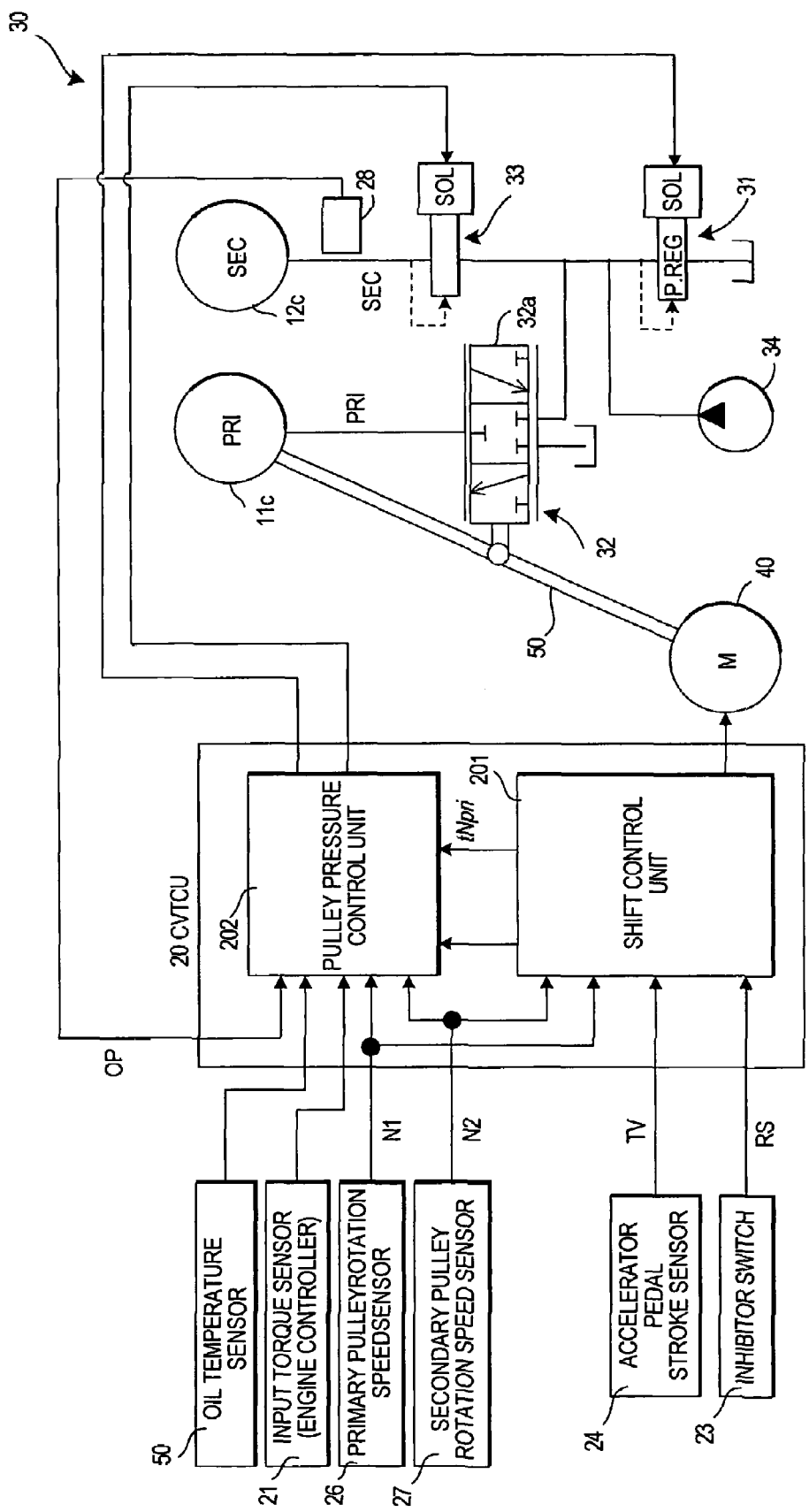
FIG. 2 is a schematic view showing an oil pressure control unit and a CVT controller of the belt type continuously variable transmission according to the embodiments.

FIG. 2 is a schematic view of an oil pressure control unit and a CVT controller of the belt type continuously variable transmission. The oil pressure control unit 30 comprises a regulator valve 31, control valve 32 and reducing valve 33. The oil pressure control unit 30 controls the oil pressure supplied from an oil pressure pump 34, and supplies it to the primary pulley 11 and secondary pulley 12.

The regulator valve 31 comprises a solenoid, and regulates the pressure of the oil supplied from the oil pressure pump 34 to a predetermined line pressure PL according to a command (for example, a duty signal) from the CVT controller 20. The command from the CVT controller 20 varies according to the vehicle running state.

The control valve 32 controls the oil pressure (hereafter, "primary pressure") of the primary pulley cylinder chamber 11c to a primary pulley target pressure, described later. The control valve 32 is connected to a servo link 50 which forms a mechanical feed back mechanism, and is driven by a step motor 40 connected to one end of the servo link 50. The control valve 32 receives a groove width, i.e., a real pulley ratio, feedback from the movable conical plate 11a of the primary pulley 11 connected to the other end of servo link 50.

The control valve 32 performs supply/discharge of oil pressure to the primary pulley cylinder chamber 11c by displacement of a spool 32a, and it adjusts the actual pulley ratio to the target pulley ratio specified by the rotation position of the step motor 40. After change of the pulley ratio is actually completed, the spool 32a, in response to a displacement from the servo link 50, is held in a shut valve position.

The reducing valve 33 comprises a solenoid, and controls the pressure (hereafter, "secondary pressure") supplied to the secondary pulley cylinder chamber 12c, to a secondary pulley target pressure, described later. The line pressure PL, supplied from an oil pressure pump 34 and regulated by the regulator valve 31, is supplied to the control valve 32 and reducing valve 33, respectively.

The pulley ratio of the primary pulley 11 and secondary pulley 12 is controlled by the driven step motor 40 according to a command signal from the CVT controller 20. The spool 32a of the control valve 32 is driven according to the displacement of the servo link 50 in response to the rotation of the step motor 40, and the line pressure PL supplied to the control valve 32 is adjusted to the primary pressure. The primary pressure is supplied to the primary pulley 11, and the groove width is variably controlled to realize a predetermined pulley ratio.

The CVT controller 20 reads a selector position RS detected by the inhibitor switch 23, an accelerator stroke (i.e., throttle opening TV) detected by an accelerator stroke sensor 24, an oil temperature TEMP of the belt type continuously variable transmission 10 detected by an oil temperature sensor 25, a primary pulley rotation speed N1 detected by a primary pulley speed sensor 26, a secondary pulley rotation speed N2 detected by a secondary pulley speed sensor 27 and an oil pressure OP detected by an oil pressure sensor 28. The CVT controller 20 performs variable control of the pulley ratio and the contact frictional force of the V-belt 13 based on the vehicle running state, such as the selector position RS, accelerator stroke TV, oil temperature TEMP, primary pulley rotation speed N1, secondary pulley rotation speed N2 and oil pressure OP. The oil pressure sensor 28 detects the secondary pressure of the secondary pulley acting on the cylinder chamber 12c as an oil pressure.

The CVT controller 20 comprises a shift control unit 201 and a pulley pressure (oil pressure) control unit 202. The shift control unit 201 determines a target pulley ratio according to the vehicle running state, such as vehicle speed and throttle opening, and drives the step motor 40 to control the present pulley ratio to the target pulley ratio. A pulley pressure (oil pressure) control unit 202 controls the thrust which the primary pulley 11 or secondary pulley 12 apply to the V-belt 13 according to the input torque, pulley ratio, oil temperature and target shift speed. The target shift speed is the target variation rate of the pulley ratio, and it is positive in a downshift and negative in an upshift.

A pulley pressure control unit 202 determines a target value of line pressure from the input torque data (engine torque data), pulley ratio, and the oil temperature, and controls the line pressure by driving the solenoid of the regulator valve 31. The pulley pressure control unit 202 further determines a target value of secondary pressure from the input torque data, pulley ratio and oil temperature, drives the solenoid of the reducing valve 33 according to the detection value and target value of the secondary pressure, and controls the secondary pressure by feedback control (closed-loop control).

The pulley pressure control unit 202 computes a transitional oil pressure which can attain a target shift speed (target variation rate of the pulley ratio) based on a transitional thrust correction amount, described later. When the pulley ratio is increased, the pulley pressure control unit 202 supplies a steady oil pressure to the primary pulley 11, and supplies the sum of a steady oil pressure and a transitional oil pressure to the secondary pulley 12. When the pulley ratio is decreased, it supplies a steady oil pressure to the secondary pulley 12, and supplies the sum of a steady oil pressure and a transitional oil pressure to the primary pulley 11.

The CVT controller 20 comprises a microcomputer comprising a central processing unit (CPU), random-access memory (RAM), read only memory (ROM), input-and-output (I/O) interface and timer. Maps used for control, described later, may be stored in the ROM or RAM.

Figure 3:
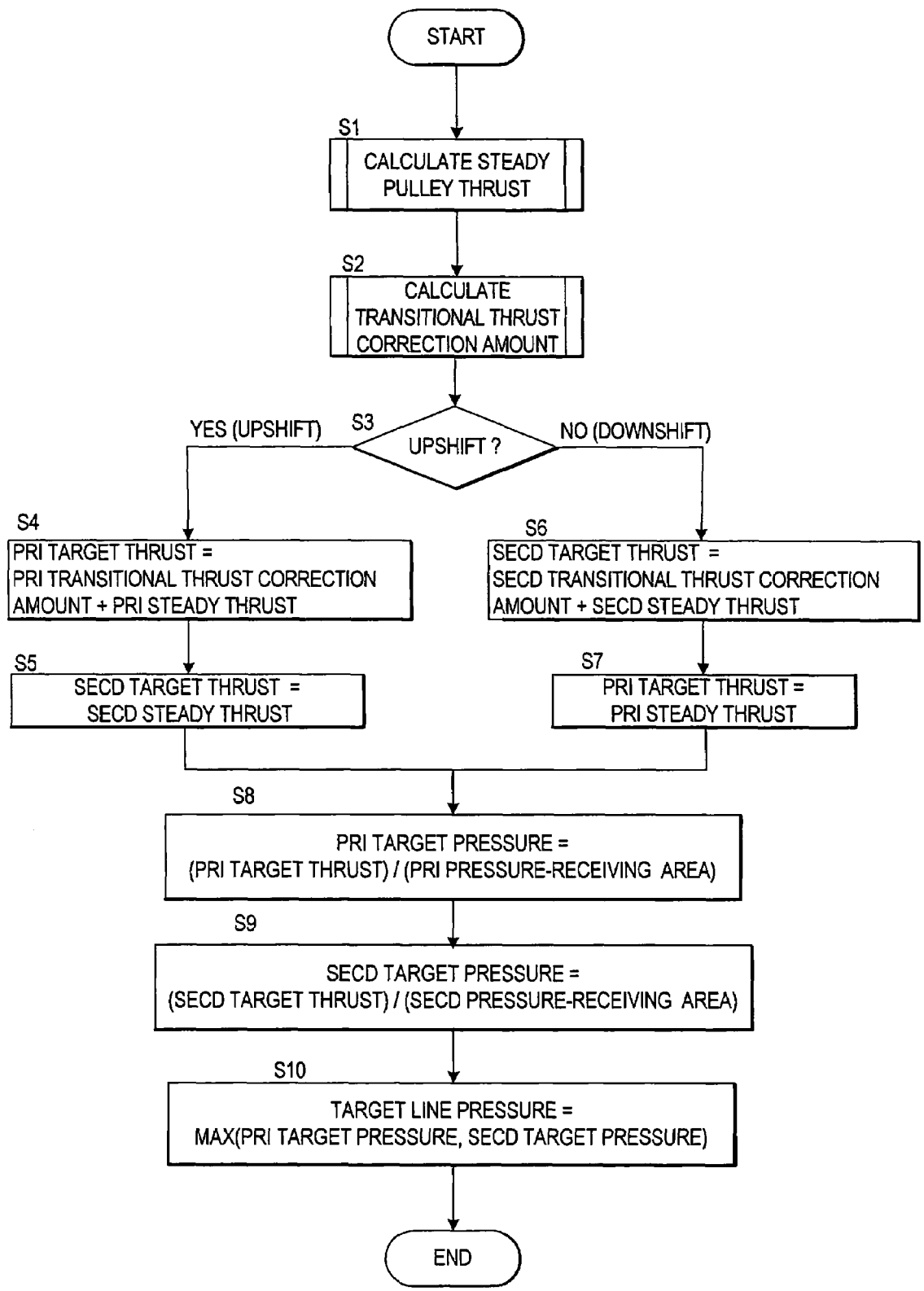
FIG. 3 is a flow chart describing a control routine relating to control of the belt type continuously variable transmission.

FIG. 3 is a flow chart describing the control routine (or program) performed by the CVT controller 20. The control routine is executed repeatedly.

In a step S1, a steady thrust (hereafter, PRI steady thrust) required by the primary pulley 11, and a steady thrust (hereafter, SECD steady thrust) required by the secondary pulley 12, are calculated. A steady thrust is the thrust required to realize the present pulley ratio and applied to the V-belt 13 from the pulley, and maintain the torque capacity (upper limiting transmission torque) of the belt. The torque capacity must be set to be larger than the input torque inputted to the primary pulley. In other words, the steady thrust maintains transmission of the present torque without allowing the belt to slide. The PRI steady thrust and SECD steady thrust will be described in detail later.

In a step S2, the transitional thrust correction amount (PRI transitional thrust correction amount) of the primary pulley 11 and the transitional thrust correction amount (SECD transitional thrust correction amount) of the secondary pulley 12, which are transitional oil pressures when changing the pulley ratio, i.e., the differential thrust required for a shift (change of pulley ratio), are calculated. The details of the calculation are described later. The transitional thrust correction amount is the difference of the thrust required to steadily maintain a certain pulley ratio, and the actual thrust.

Next, in a step S3, it is determined whether to perform an upshift or a downshift. This determination is made according to the target shift speed calculated in the subroutine of the step S2. The calculation of target shift speed is described in more detail in a step S21, mentioned later.

Here, in the case of an upshift, the routine proceeds to a step S4, and a primary pulley target thrust (PRI target thrust) is set to a value obtained by adding the PRI transitional thrust correction amount to the PRI steady thrust. In a step S5, a secondary pulley target thrust (SECD target thrust) is set as the SECD steady thrust.

On the other hand, in a downshift, the routine proceeds to a step S6, and the secondary pulley target thrust (SECD target thrust) is set to the sum of the SECD steady thrust and a SECD transitional thrust correction amount.

In a step S7, the primary pulley target thrust (PRI target thrust) is set to the PRI steady thrust.

Next, in a step S8, a primary pulley target pressure (hereafter, PRI target pressure) is set to a value obtained by dividing the PRI target thrust by a pressure-receiving area (hereafter, PRI pressure-receiving area) of the primary pulley 12. In a step S9, a secondary pulley target pressure (hereafter, SECD target pressure) is set to a value obtained by dividing the SECD target thrust by a pressure-receiving area (hereafter, SECD pressure-receiving area) of the secondary pulley 12.

Next, in a step S10, a target line pressure (hereafter, PL target pressure) is set to the larger of the PRI target pressure and SECD target pressure. The solenoid of the regulator valve 31 is controlled so that the line pressure coincides with the PL target pressure.

Figure 4:
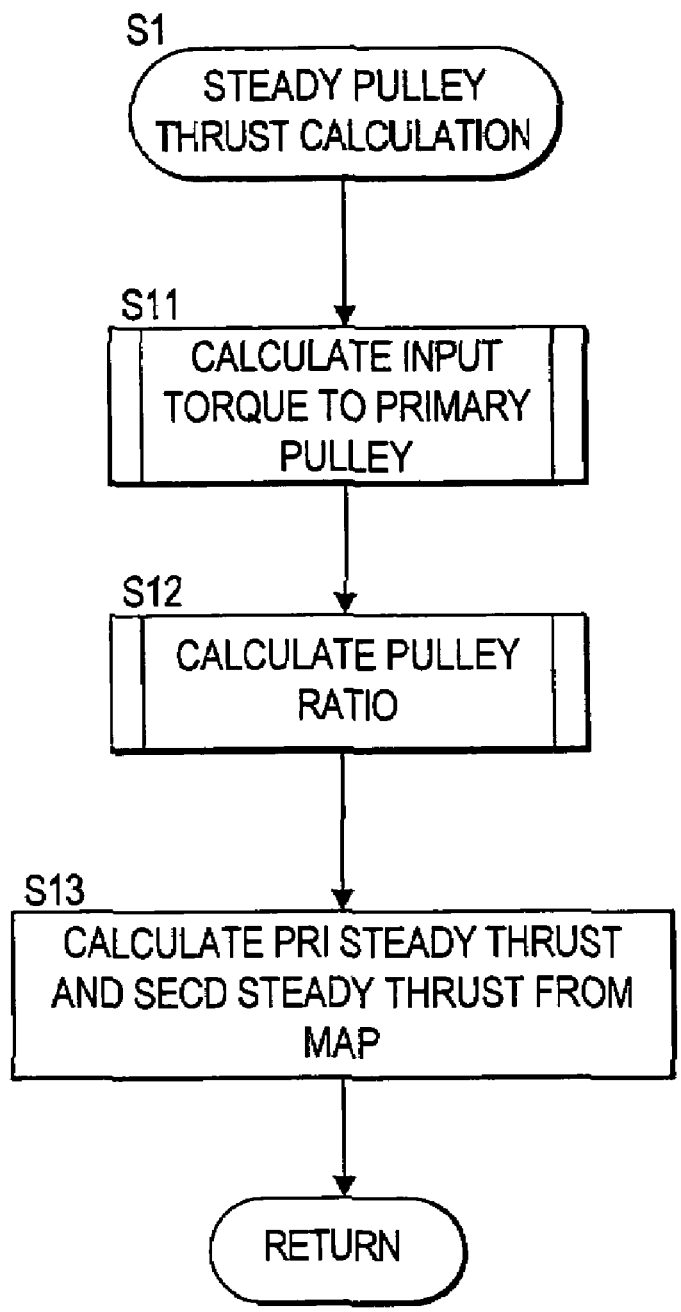
FIG. 4 is a flow chart of a subroutine which calculates a steady thrust (thrust when a fixed pulley ratio is maintained) of a primary pulley and a secondary pulley.
Figure 5A:
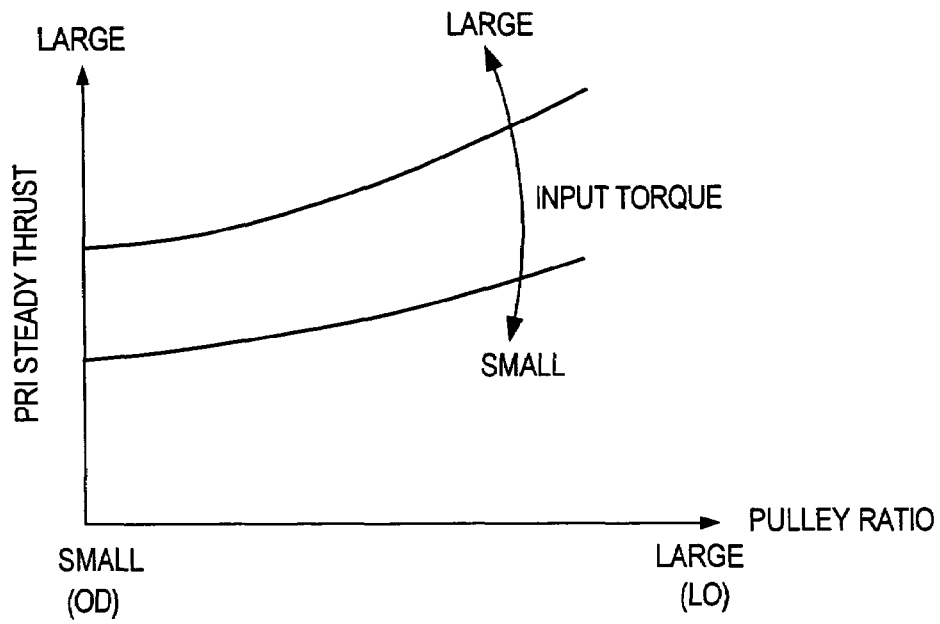
FIG. 5A is a thrust map specifying a relation between a pulley ratio and a pulley thrust for a primary pulley.

FIG. 4 is a flow chart of a subroutine (S1) which calculates the steady thrust of the primary pulley 11 and secondary pulley 12. The steady thrust is the thrust when a fixed pulley ratio is maintained. FIG. 5A is a thrust map specifying a relation between the pulley ratio and the steady thrust of the primary pulley according to the input torque inputted to the primary pulley 11, and FIG. 5B is a thrust map showing a relation between the pulley ratio and the steady thrust of the secondary pulley according to the input torque inputted to the primary pulley 11.

In a step S11, an input torque to the primary pulley 11 is calculated. For example, the input torque to the primary pulley 11 is the product of the actual engine torque which is an input torque data from the engine controller 21, and the torque ratio of the torque converter 2. The torque ratio of the torque converter 2 is the ratio of the input torque to the torque converter 2 to the output torque from the torque converter 2.

In a step S12, the present pulley ratio (actual pulley ratio) is calculated from the primary pulley rotation speed detected by the primary pulley speed sensor 26, and the secondary pulley rotation speed detected by the secondary pulley speed sensor 27. The pulley ratio is a value obtained by dividing the primary pulley rotation speed N1 by the secondary pulley rotation speed N2.

Figure 5B:
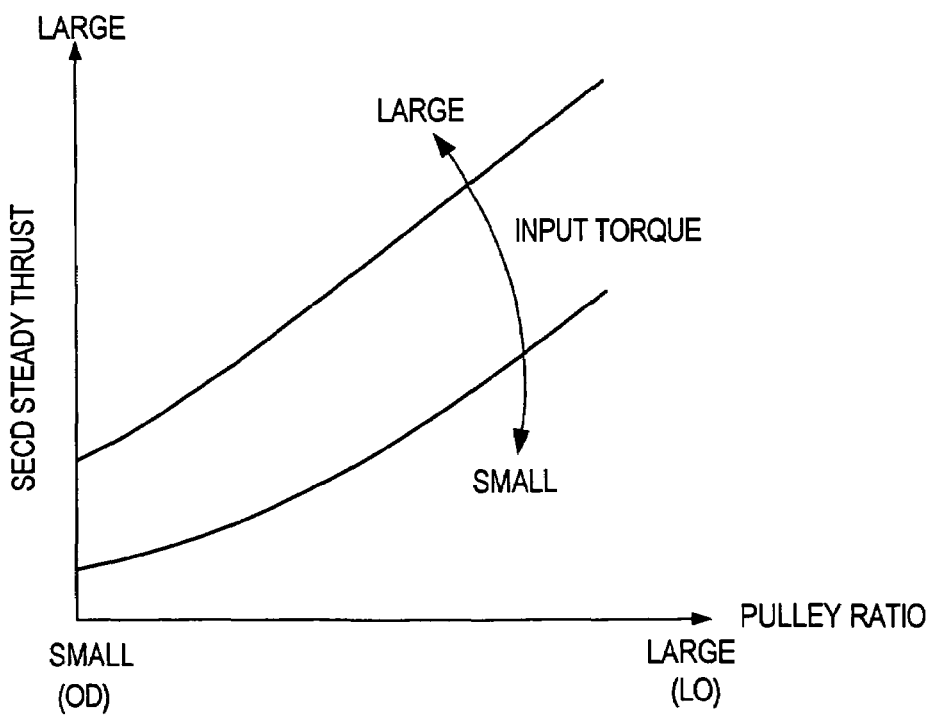
FIG. 5B is a thrust map specifying a relation between a pulley ratio and a pulley thrust for a secondary pulley.

In a step S13, the steady thrust (PRI steady thrust) of the primary pulley 11 is calculated from a thrust map for the primary pulley (FIG. 5A), and the steady thrust (SECD steady thrust) of the secondary pulley 12 is calculated from a thrust map for the secondary pulley (FIG. 5B).

The thrust maps of FIGS. 5A and 5B show the pulley ratio on the horizontal axis, and thrust on the vertical axis. The pulley ratio is larger the further to the right-hand side of the figure, which is the LOW side. The relation between the pulley ratio and thrust is set for each input torque, and the steady thrust is set to be larger the larger the input torque is even when the pulley ratio is the same.

Comparing the steady thrust of the primary pulley 11 and the steady thrust of the secondary pulley 12, as seen from FIGS. 5A and 5B, when the pulley ratio is small, the steady thrust of the primary pulley 11 is set to be a larger value than the steady thrust of the secondary pulley 12, and when the pulley ratio is large, the steady thrust of the secondary pulley 12 is set to be a larger value than the steady thrust of the primary pulley 11. Therefore, on the whole, the steady thrust of the primary pulley 11 of FIG. 5A gradually increases more than the steady thrust of the secondary pulley 12 of FIG. 5B according to an increase in the pulley ratio.

The pulley pressure control unit 202 receives a target pulley rotation speed (tNpri) of the primary pulley 11 from the shift control unit 201, and computes the transitional oil pressure which can realize the target shift speed of the pulley ratio according to the target pulley rotation speed and target shift speed (or target stroke speed).

Figure 6:
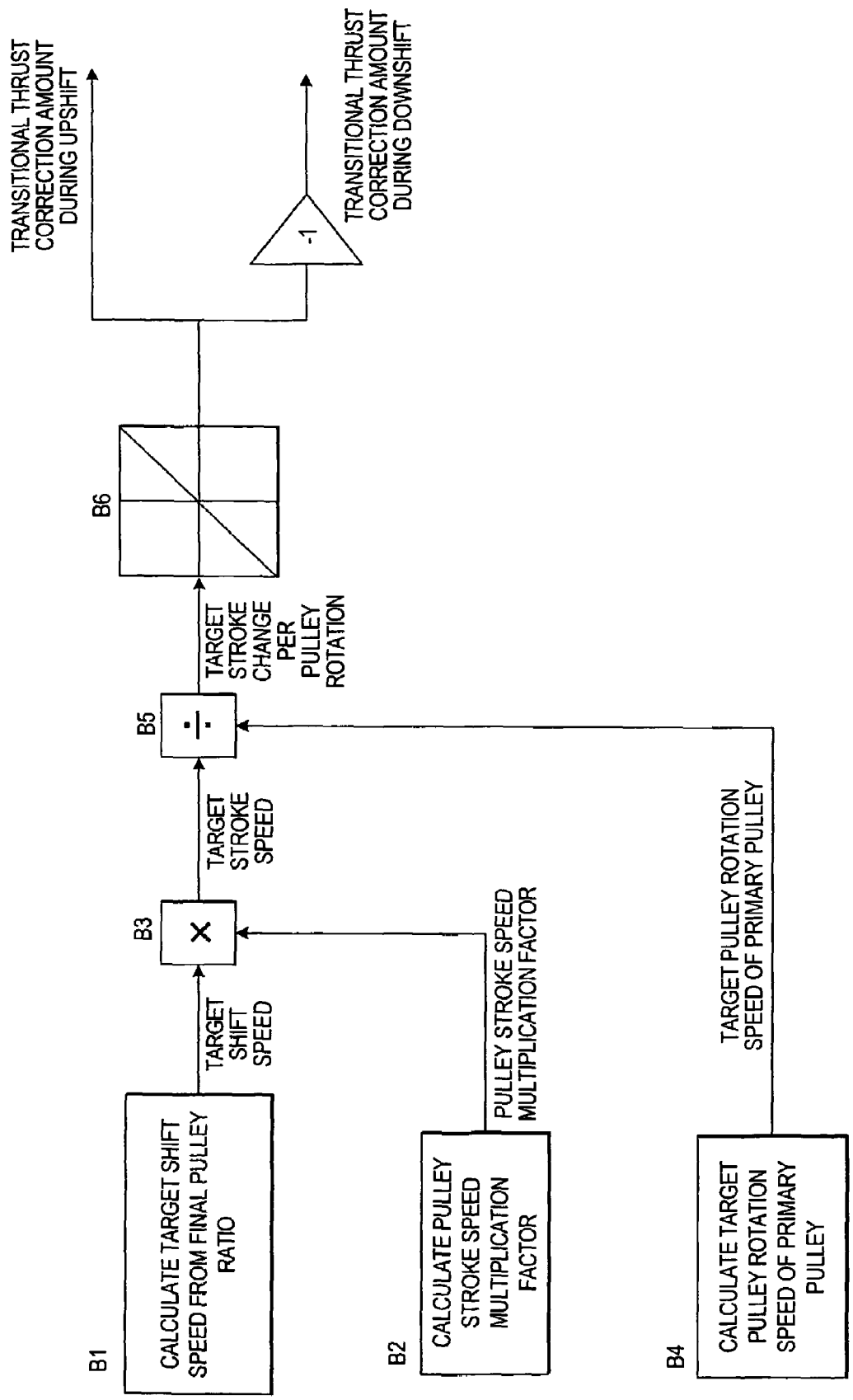
FIG. 6 is a block diagram showing a control routine which computes a transitional thrust correction amount of the primary pulley and secondary pulley in a transient state (when the pulley ratio changes).

Referring to FIG. 6, the pulley pressure control unit 202 computes the transitional thrust correction amount of the primary pulley 11 and secondary pulley 12. FIG. 6 is a block diagram showing a routine for computing the transitional thrust correction amount.

Figure 7:
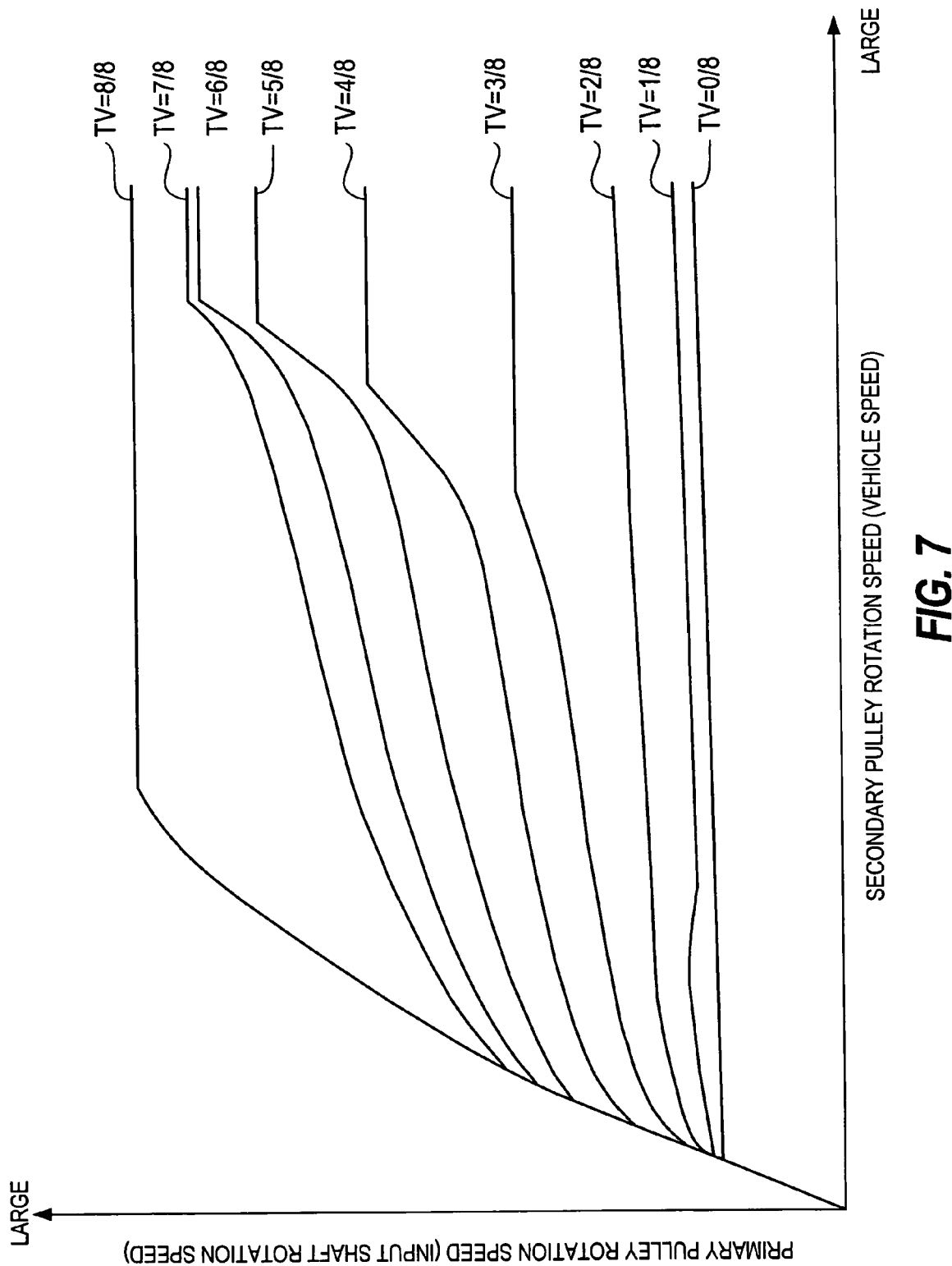
FIG. 7 is a shift map.

In a processing unit B1, a target shift speed (target variation rate of the pulley ratio) is determined based on a shift map of FIG. 7. For example, a final pulley ratio is computed by referring to the shift map of FIG. 7 based on the vehicle speed and a throttle opening TV, i.e., accelerator stroke. The final pulley ratio is defined as a final target pulley ratio. Target time constants set for each type of shift, such as upshift, downshift and downshift when the accelerator pedal was depressed, are also referred to. For example, the target pulley ratio is computed by delaying the achievement of the final pulley ratio by the set target time constant of a first order delay. The target shift speed is set as the value obtained by dividing a value obtained by subtracting the target pulley ratio from the final pulley ratio, by the target time constant. The target pulley ratio may be determined by another known method, from the final pulley ratio.

Figure 8:
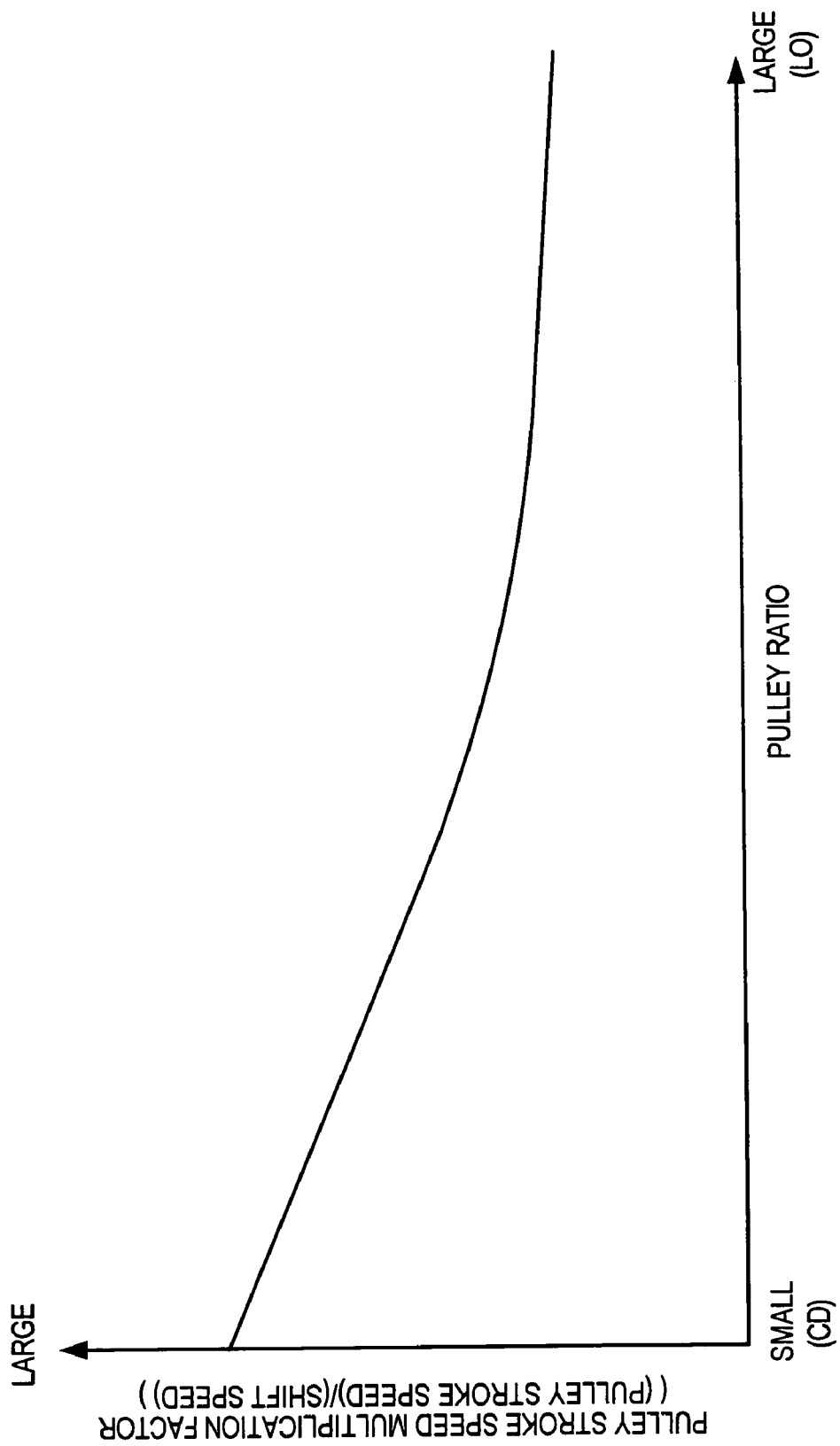
FIG. 8 is a map specifying a relation between the pulley ratio and a pulley stroke speed multiplication factor.

In a processing unit B2, a pulley stroke speed multiplication factor is calculated from the target pulley ratio based on a pulley stroke speed multiplication factor map of FIG. 8.

The pulley stroke speed multiplication factor is the ratio of pulley stroke speed to the shift speed. The pulley stroke speed multiplication factor map of FIG. 8 sets the pulley stroke speed multiplication factor relative to the pulley ratio beforehand. The pulley stroke speed is the displacement speed of the movable conical plate in the direction of the shaft.

In a processing unit B3, the target stroke speed (mm/sec) of the pulleys is computed as the product of the target shift speed and pulley stroke speed multiplication factor.

In a processing unit B4, the target pulley rotation speed of the primary pulley 11 is calculated from the secondary pulley rotation speed (vehicle speed) and throttle opening based on the shift map of FIG. 7.

In a processing unit B5, the target stroke change per pulley rotation (mm/rev) is computed by dividing the target stroke speed of the pulley by the target pulley rotation speed of the primary pulley 11.

Figure 9:
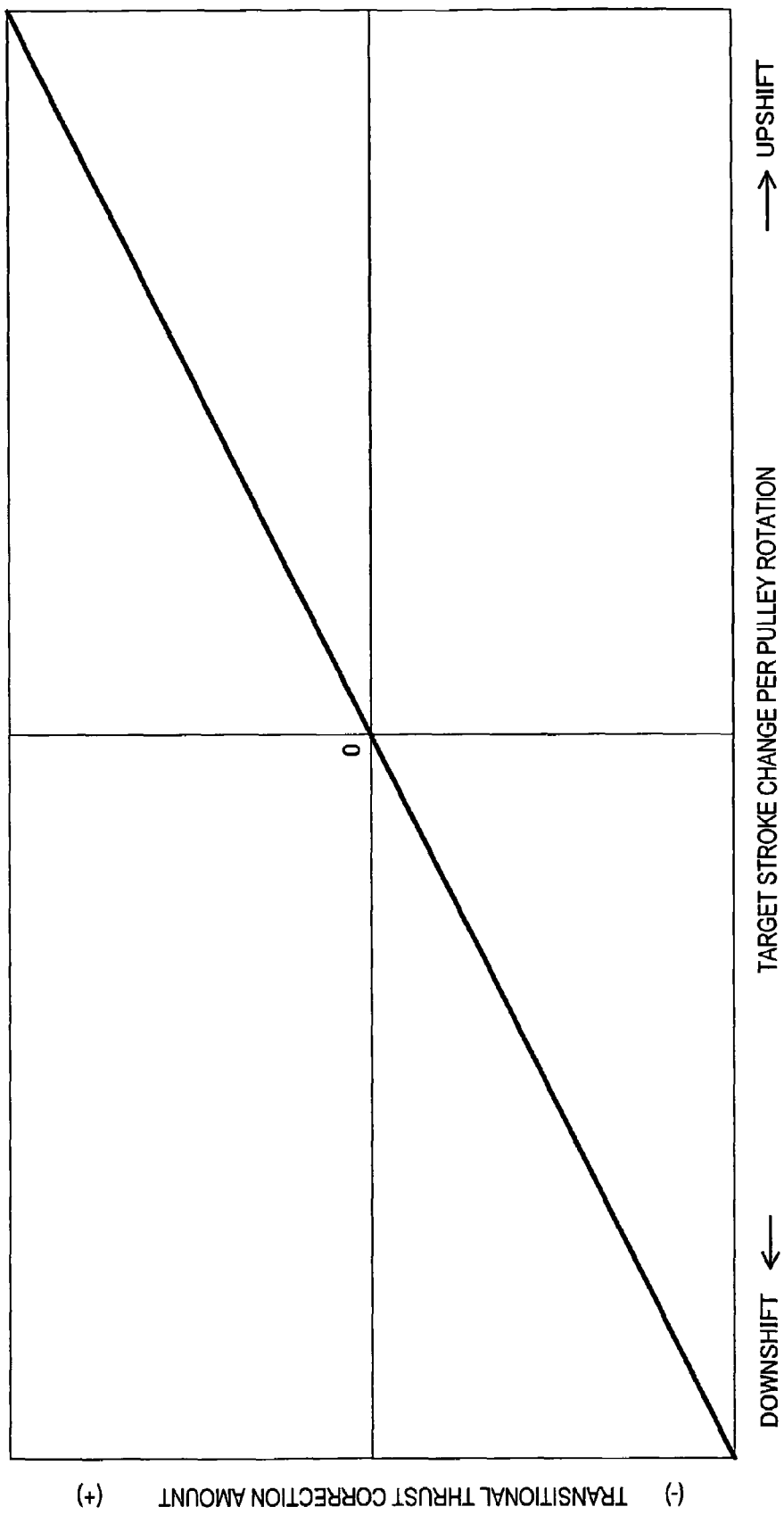
FIG. 9 is a map specifying a relation between the transitional thrust correction amount of the pulley and a target stroke change per pulley rotation.

In a processing unit B6, the transitional thrust correction amount of the pulley is calculated according to the target stroke change per pulley rotation, based on a map shown in FIG. 9. The transitional thrust correction amount is determined in response to the target pulley rotation speed and target stroke speed since the target stroke change per pulley rotation is computed by dividing the target stroke speed of the pulleys by the target pulley rotation speed of the primary pulley 11.

During an upshift (when the target shift speed is negative), the target thrust of the primary pulley is set to the sum of the calculated transitional thrust correction amount (positive value) and the steady thrust (PRI steady thrust) of the primary pulley.

During a downshift (when the target shift speed is positive), the positive/negative sign of the calculated transitional thrust correction amount is reversed. Thus, the absolute value of the calculated transitional thrust correction amount is used as a transitional thrust correction amount in the step S6. The target thrust of the secondary pulley is set to the sum of the transitional thrust correction amount (absolute value), and the steady thrust (SECD steady thrust) of the secondary pulley.

In the map of FIG. 9, the transitional thrust correction amount of the pulley relative to the target stroke change per pulley rotation, is properly set beforehand by experiment, for example. The transitional thrust correction amount of the pulley becomes larger, the more the target stroke change per pulley rotation of the primary pulley 11 increases. The transitional thrust correction amount varies linearly relative to the target stroke change per pulley rotation and it becomes zero when the target stroke change per pulley rotation is zero, i.e., when the pulley ratio is not changed.

Figure 10:
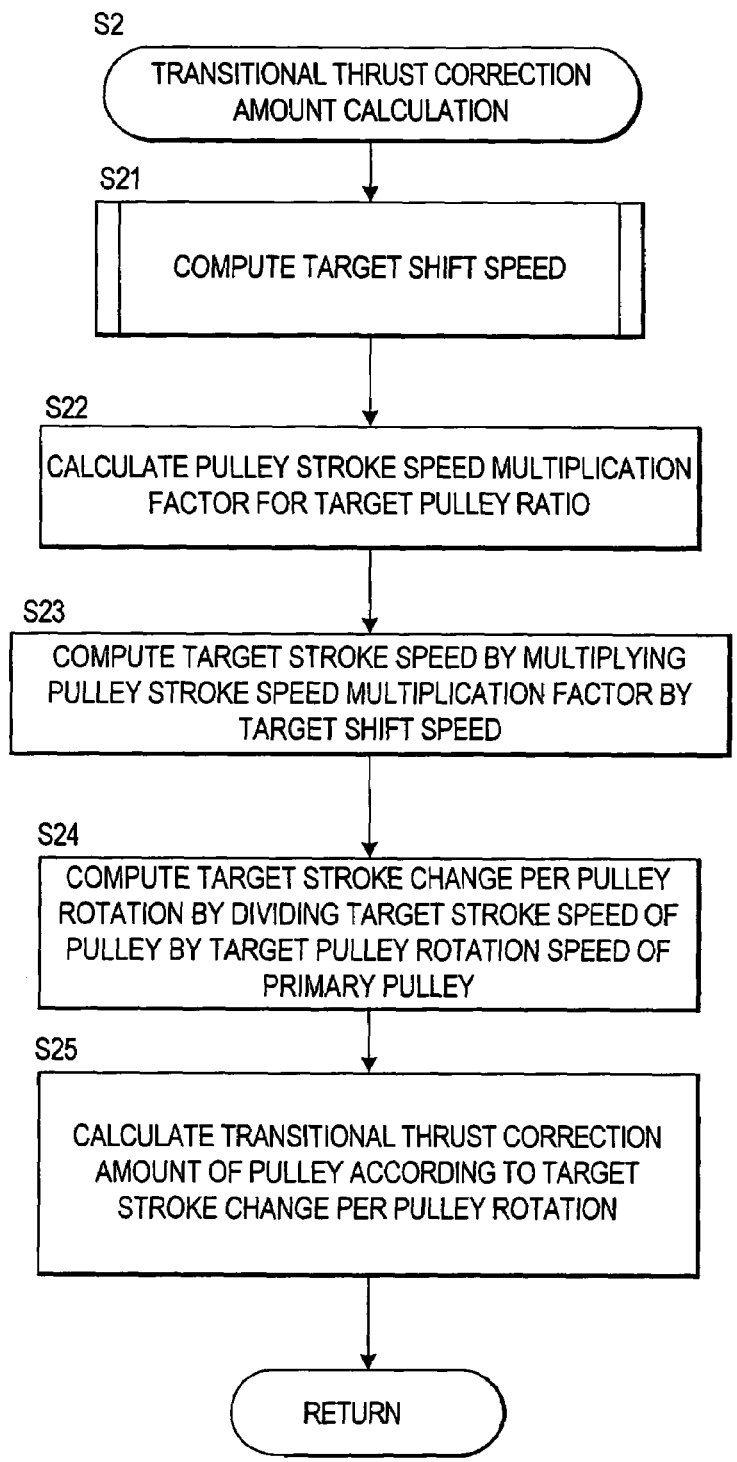
FIG. 10 is a flow chart of a subroutine which computes the transitional thrust correction amount of the primary pulley and secondary pulley in a transient state (when the pulley ratio changes).

FIG. 10 is a flow chart of a subroutine which computes the transitional thrust correction amount of the primary pulley and secondary pulley during a pulley ratio change. This flow chart is equivalent to the block diagram of FIG. 6.

In a step S21, the present target shift speed is computed.

In a step S22, the pulley stroke speed multiplication factor relative to the target pulley ratio, is calculated from the pulley stroke speed multiplication factor map (FIG. 8).

In a step S23, the target stroke speed of the pulleys is computed by multiplying the pulley stroke speed multiplication factor by the target shift speed computed in the step S21.

In a step S24, the target stroke change while the primary pulley 11 performs one rotation, is computed by dividing the target stroke speed of the pulleys computed in the step S23 by the target pulley rotation speed of the primary pulley 11.

In a step S25, the transitional thrust correction amount of the pulley according to the target stroke change computed in the step S24, is calculated based on the map shown in FIG. 9.

The advantage of this embodiment will now be described referring to FIGS. 11 and 12.

FIG. 11 is a time chart of a downshift when the accelerator pedal is depressed, and an upshift when the accelerator pedal is released.

At a time t1, the accelerator pedal is suddenly depressed, and at a time t3, the accelerator pedal is suddenly released. The pulley ratio is downshifted from the overdrive (OD) side (or the HIGH side) to the LO side. At this time, based on the computed target shift speed, the transitional thrust correction amount which is the differential thrust required for pulley ratio change, is added to the SECD steady thrust on the secondary pulley. By setting the sum of the differential thrust and SECD steady thrust as the target thrust of the secondary pulley, the increase in oil pressure required for pulley ratio change is applied to the secondary pulley (shaded part of FIG. 11). On the other hand, the primary pulley pressure is still the steady pressure computed from the steady thrust.

From time t1 to t2, the input torque increases because the accelerator pedal 29 is depressed, and the actual pulley ratio continues increasing. For this reason, the primary pressure and secondary pressure corresponding to the PRI steady thrust and SECD steady thrust continue increasing. In other words, in this time t1–t2, in the step S1, the steady thrust (PRI steady thrust) of the primary pulley and the steady thrust (SECD steady thrust) of the secondary pulley are computed from the input torque to the primary pulley 11, and the present pulley ratio (actual pulley ratio). In the step S2, the target shift speed is computed, and the pulley stroke speed multiplication factor relative to the target pulley ratio is calcualated from the map of FIG. 8. By multiplying the pulley stroke speed multiplication factor by the target shift speed of the pulley ratio, the target stroke speed of the pulleys is computed, and the pulley transitional thrust correction amount of the secondary pulley 12 according to the target stroke change per pulley rotation is then calculated.

In a step S3, a downshift determination (determination of pulley ratio increase) is performed based on the target shift speed, and the routine proceeds to a step S6. In a step S6, the secondary pulley target thrust (SECD target thrust) is set to a value obtained by adding the SECD transitional thrust correction amount (absolute value) to the SECD steady thrust. In a step S7, the primary pulley target thrust (PRI target thrust) is set to the PRI steady thrust. In a step S8, the primary pulley target pressure (PRI target pressure) is set to a value obtained by dividing the PRI target thrust by the pressure-receiving area of the primary pulley. In a step S9, the secondary pulley target pressure (SECD target pressure) is set as a value obtained by dividing the SECD target thrust by the pressure-receiving area of the secondary pulley. In a step S10, the target line pressure (PL target pressure) is set to the larger of the PRI target pressure and SECD target pressure. The solenoid of the regulator valve 31 is controlled to make the line pressure equal to the PL target pressure. These steps are repeated until a time t2 when the actual pulley ratio reaches the final pulley ratio.

At the time t2, when the actual pulley ratio coincides with the final pulley ratio, since the transitional thrust correction amount of the secondary pulley 12 computed from the target shift speed is 0, both the target thrust (PRI target thrust) of the primary pulley and target thrust (SECD target thrust) of the secondary pulley are steady thrusts (PRI steady thrust, SECD steady thrust). As a result, since the accelerator stroke does not change and there is also no change of input torque, the primary pressure and secondary pressure are maintained at steady values.

Subsequently, when the accelerator pedal is suddenly released, the pulley ratio is upshifted from the LO side to the OD side (HIGH side) in a time t3–t4. The target thrust of the primary pulley is set to the sum of the transitional thrust correction amount and PRI steady thrust, based on the computed target shift speed, and the oil pressure increase required for a shift (change of pulley ratio) is performed on the primary pulley side (shaded part of FIG. 11). During the interval t3–t4, the secondary pulley pressure is still the steady pressure computed from the steady thrust. During this interval, since the input torque decreases and the actual pulley ratio continues falling due to release of the accelerator pedal, the computed PRI steady thrust and SECD steady thrust also continue decreasing. Specifically, during the time t3–t4, in the step S1, the steady thrust (PRI steady thrust) of the primary pulley and the steady thrust (SECD steady thrust) of the secondary pulley are computed from the input torque to the primary pulley 11, and the present pulley ratio (actual pulley ratio). In the step S2, the target shift speed is computed, the pulley stroke speed multiplication factor relative to the target pulley ratio is calculated from the map of FIG. 8, and the product of this multiplication factor and the target shift speed is computed as the target stroke speed of the pulleys. Then, the pulley transitional thrust correction amount of the primary pulley 11 is calculated according to the target stroke change per pulley rotation.

In the step S3, an upshift determination is performed based on the target shift speed, and the routine proceeds to a step S4. In the step S4, the sum of the PRI steady thrust and PRI transitional thrust correction amount is set as the primary pulley target thrust (PRI target thrust). In a step S5, the secondary pulley target thrust (SECD target thrust) is set as the SECD steady thrust. In a step S8, the primary pulley target pressure (PRI target pressure) is set to a value obtained by dividing the PRI target thrust by the pressure-receiving area of the primary pulley. In a step S9, the secondary pulley target pressure (SECD target pressure) is set to a value obtained by dividing the SECD target thrust by the pressure-receiving area of the secondary pulley. In a step S10, the target line pressure (PL target pressure) is set to the larger of the PRI target pressure and SECD target pressure. The solenoid of the regulator valve 31 is controlled so that the line pressure is the PL target pressure. These steps are repeated until a time t4 when the actual pulley ratio is the final pulley ratio.

According to this embodiment, the pulley ratio is varied by adding the transitional oil pressure to the steady oil pressure, so a shift of the pulley ratio is performed while the torque capacity of the pulley is always maintained. For example, during a downshift, slipping of the belt due to excessive lowering of the oil pressure of the primary pulley is prevented. In this way, impaired durability of the belt is prevented.

Figure 12:
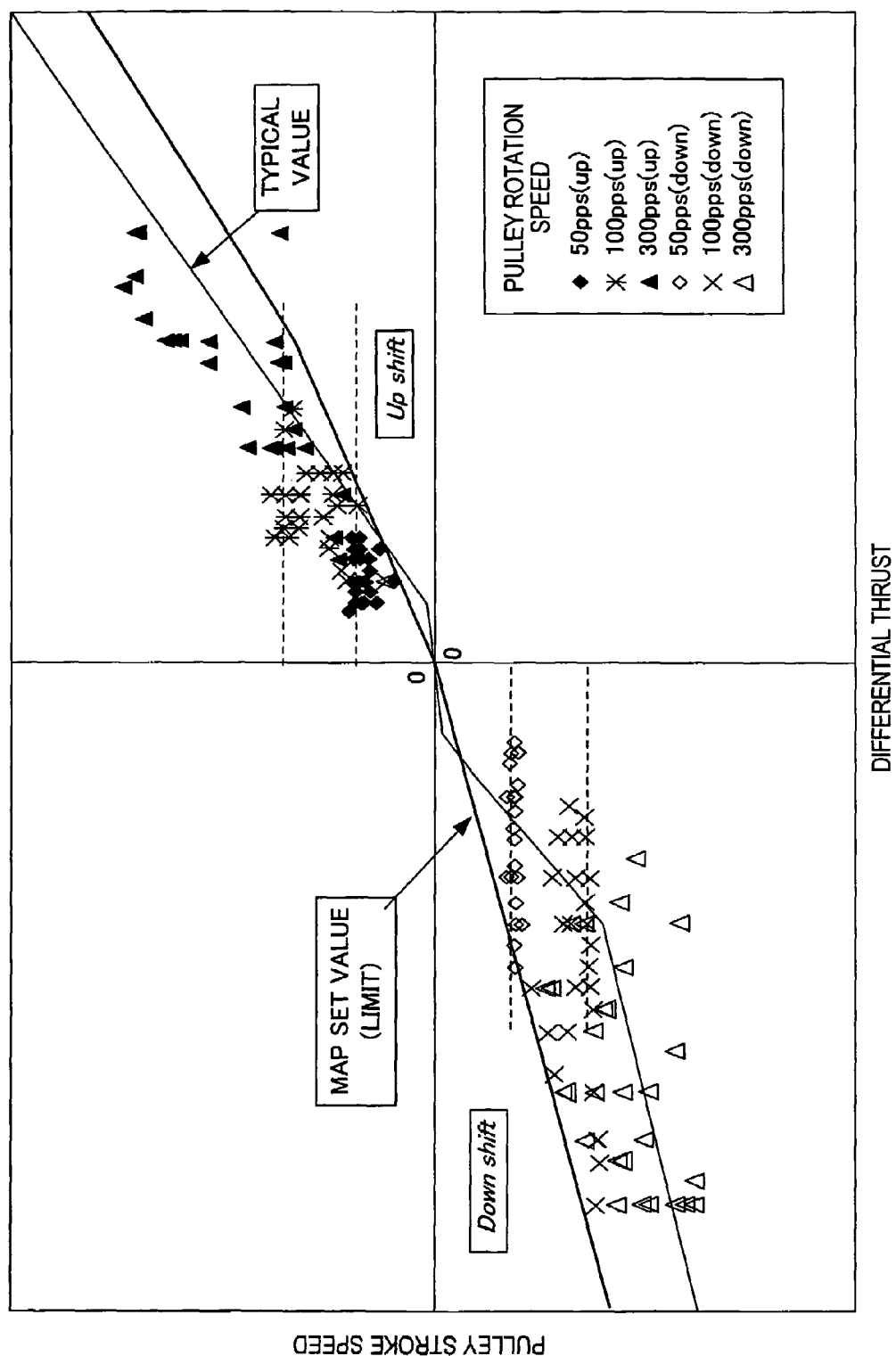
FIG. 12 is a graph obtained experimentally showing a relation between pulley stroke speed and differential thrust.

As shown by the experimental results of FIG. 12, the relation of the differential thrust and pulley stroke speed required for pulley ratio change is not determined uniquely, but varies according to the rotation speed of the pulley. In the prior art, the differential thrust required for pulley ratio change was computed by the target shift speed (target variation rate of pulley ratio). For this reason, as shown in FIG. 12, the absolute value of a target differential thrust (transitional thrust correction amount) needed to be set by a map as an upper limit value considering the variation of pulley rotation speed. Hence, in the prior art, since the differential thrust is increased more than necessary in the running region where the pulley rotation speed is low, the drive load of the oil pressure pump 34 becomes large, and fuel consumption is impaired.

From experiments, it was found that the suitable transitional thrust correction amount varies linearly relative to the target stroke change per pulley rotation. In this embodiment, the target stroke change of the pulley while the primary pulley 11 performs one rotation was computed. The relation of the target stroke change per pulley rotation and the transitional thrust correction amount is set based on experiments on the map of FIG. 9. For this reason, the differential thrust required for change of pulley ratio is calculated according to the target stroke change per pulley rotation considering the target pulley rotation speed of the primary pulley 11. As a result, the differential thrust required for change of pulley ratio can be made to approach the required minimum value, thereby allowing suppression of the load of the oil pressure pump 34 and reduction of the fuel consumption of the engine 1. Further, the oil pressure pump 34 can be made more compact, and the whole oil pressure system can be made more compact and has reduced friction.

In other words, in the map of FIG. 9, by using the target stroke change per pulley rotation as a parameter, the relation between the transitional thrust correction amount and the target stroke change per pulley rotation can be made a first order function. Hence, computational speed is increased and control response is enhanced.

Although the map of FIG. 9 is a two quadrant map with an upshift and downshift side, the map value on the upshift side and the map value on the downshift side are set symmetrically. Therefore, a common one quadrant map may be used for the upshift and downshift side, sharing map values.

Figure 13:
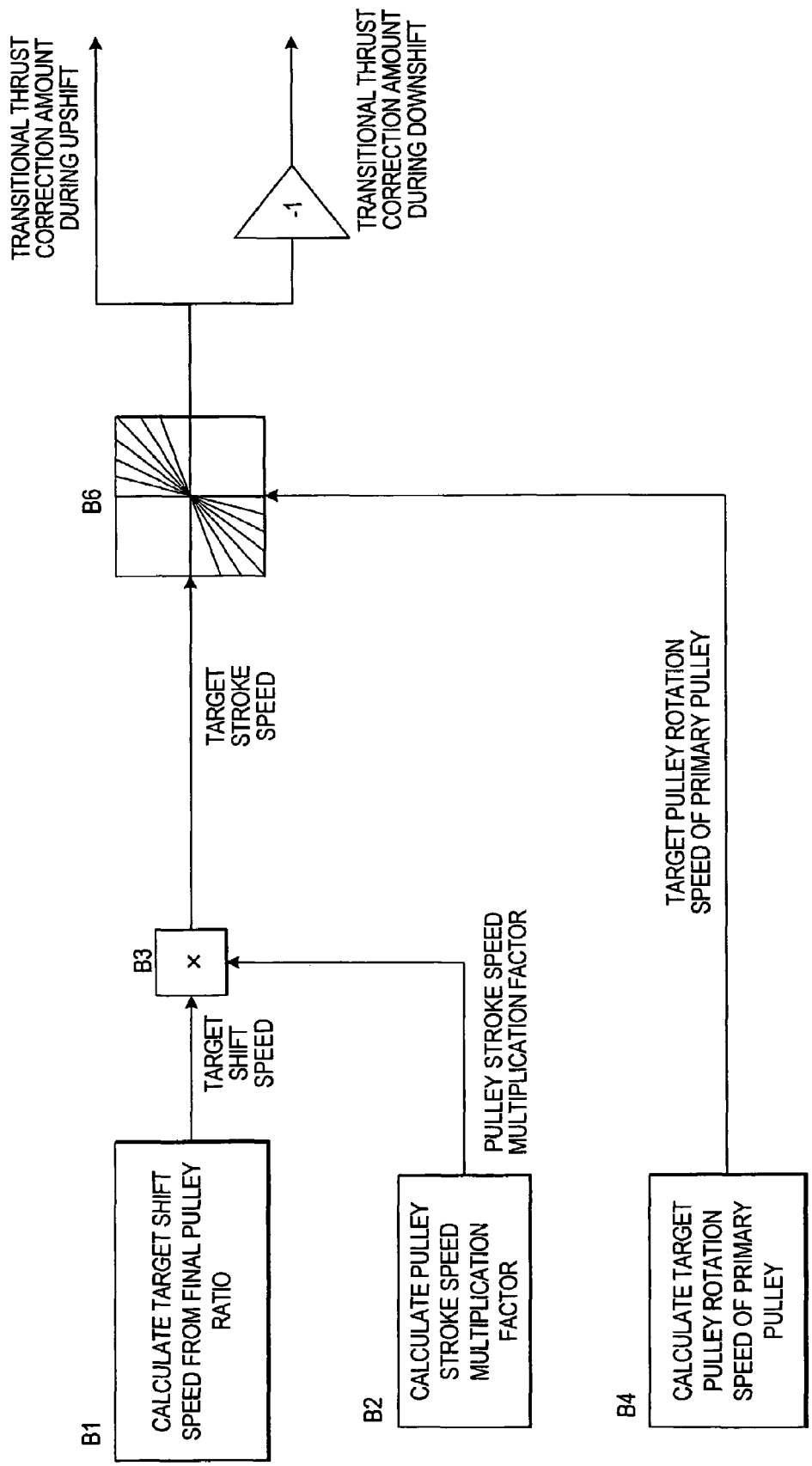
FIG. 13 is a block diagram showing a control routine which computes the transitional thrust correction amount of the primary pulley and secondary pulley (when the pulley ratio changes), as a second embodiment.

A second embodiment for computing the transitional thrust correction amount will now be described referring to FIG. 13. As shown in FIG. 13, the pulley pressure control unit 202 may compute the transitional thrust correction amount of the primary pulley 11 and secondary pulley 12.

In the processing unit B1, the target shift speed is determined based on the shift map of FIG. 7.

In the processing unit B2, the pulley stroke speed multiplication factor (ratio of pulley stroke speed to shift speed) is calculated from the target pulley ratio based on the pulley stroke speed multiplication factor map of FIG. 8.

In the processing unit B3, the target stroke speed of the pulleys is computed as the product of the target shift speed and pulley stroke speed multiplication factor.

In the processing unit B4, the target pulley rotation speed of the primary pulley 11 is calculated based on the vehicle speed and the throttle opening TV, based on the shift map of FIG. 7.

Figure 14:
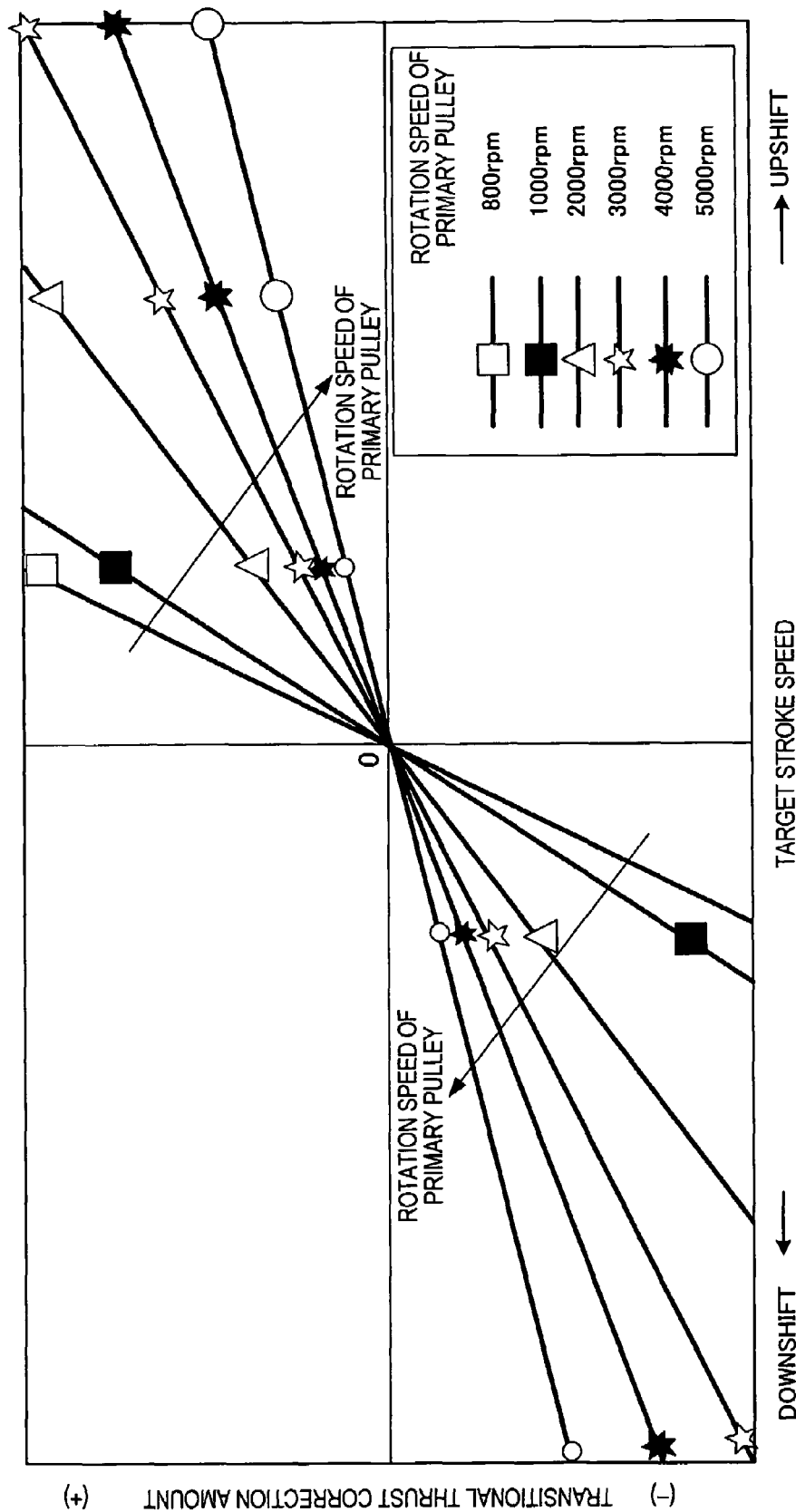
FIG. 14 is a map showing a relation between a transitional thrust correction amount and a target stroke speed of a pulley for each target pulley rotation speed of a primary pulley, according to the second embodiment.

In the processing unit B6, the transitional thrust correction amount of the pulley is calculated from the target stroke speed of the pulleys and the target pulley rotation speed of the primary pulley 11 are based on the map shown in FIG. 14.

During an upshift, the calculated transitional thrust correction amount (positive value) is outputted as it is. This transitional thrust correction amount is added to the steady thrust on the primary pulley side (PRI steady thrust). The target thrust of the primary pulley is set to the sum of the transitional thrust correction amount and the PRI steady thrust.

During a downshift, the calculated transitional thrust correction amount reverses its positive/negative sign, and is outputted. In other words, the absolute value of the calculated transitional thrust correction amount is outputted as a transitional thrust correction amount used in the step S6. The target thrust of the secondary pulley is set to the sum of the absolute value of the transitional thrust correction amount, and the steady thrust on the secondary pulley side (SECD steady thrust).

In the map of FIG. 14, the transitional thrust correction amount of the pulley relative to the target stroke speed of the pulleys and the target pulley rotation speed of the primary pulley 11 is set beforehand by experiment, for example. The map of FIG. 14 is a map of two quadrants with an upshift side and a downshift side. The absolute value of the transitional thrust correction amount of the pulley is smaller, the more the target pulley rotation speed of the primary pulley 11 increases. The transitional thrust correction amount of the pulley varies linearly relative to the target stroke speed of the pulleys.

In the second embodiment, the target stroke speed of the pulleys is computed, and the transitional thrust correction amount of the pulley relative to the target stroke speed of the pulleys and the target pulley rotation speed of the primary pulley 11 is set using the map of FIG. 14. For this reason, since the differential thrust required for a shift is made to approach the required minimum value, the load of the oil pressure pump 34 can be suppressed and the fuel consumption of the engine 1 can be reduced.

Although the invention has been described above by reference to certain embodiments of the invention, the invention is not limited to the embodiments described above.

In the above embodiments, in the calculation of primary pressure and secondary pressure, the sum of the steady thrust and transitional thrust correction amount is converted into an oil pressure. However, the invention is not limited thereto, and after converting the steady thrust and transitional thrust respectively into oil pressures, they can be added according to whether the speed change is an upshift or downshift, and the primary pressure and secondary pressure then computed.

Further, the transitional thrust correction amount may be made to vary according to the oil temperature. For example, the transitional thrust correction amount may be made to increase when at low temperature when the oil temperature falls below a predetermined value, or at high temperature when the oil temperature rises above a predetermined value.

Also, examples of the determination processing of the transitional thrust correction amount are shown by the block diagram of FIG. 6, or the block diagram of FIG. 13, respectively, but the invention is not limited thereto and they may be replaced by other processing.

Modifications and variations of the embodiment described above will occur to those skilled in the art, in light of the above teachings. The scope of the invention is defined with reference to the following claims.

The entire contents of Japanese Patent Application P2004-278029 (filed Sep. 24, 2004) are incorporated herein by reference.

What is claimed is:

1. A belt type continuously variable transmission, comprising:
a primary pulley on an input side having a groove which varies according to an oil pressure;
a secondary pulley on an output side having a groove which varies according to an oil pressure;
a belt wound around the primary pulley and secondary pulley;
detecting means for detecting a vehicle running state;
pulley ratio setting means for setting a final pulley ratio achieved by a shift of the pulley ratio of the primary and secondary pulleys, based on the vehicle running state;
steady oil pressure computing means for computing a primary steady oil pressure supplied to the primary pulley and a secondary steady oil pressure supplied to the secondary pulley, according to an input torque inputted to the primary pulley and an actual pulley ratio;
target shift speed determining means for determining a target shift speed based on the final pulley ratio;
target stroke speed computing means for computing a target stroke speed of the primary pulley and/or secondary pulley from the target shift speed;
target pulley rotation speed computing means for computing a target pulley rotation speed of the primary pulley, based on the vehicle running state;
transitional oil pressure computing means for computing a transitional oil pressure correction amount which can attain the target shift speed, in response to the target pulley rotation speed of the primary pulley and the target stroke speed; and
oil-pressure control means for setting one of the oil pressure supplied to the primary pulley and the oil pressure supplied to the secondary pulley, to the sum of the steady oil pressure and transitional oil pressure correction amount, so as to attain the final pulley ratio.

2. The belt type continuously variable transmission as defined in claim 1, comprising a target stroke change calculating means for calculating a target stroke change per pulley rotation based on a value obtained by dividing the target stroke speed by the target pulley rotation speed,
wherein the transitional oil pressure computing means computes the transitional oil pressure correction amount according to the target stroke change per pulley rotation.

3. The belt type continuously variable transmission as defined in claim 2, wherein the transitional oil pressure correction amount has a proportional relation to the target stroke speed.

4. The belt type continuously variable transmission as defined in claim 1, wherein the primary and secondary steady oil pressures are oil pressures required to attain a torque capacity of the belt which is larger than the input torque to the primary pulley.

5. A belt type continuously variable transmission, comprising:
a primary pulley on an input side having a groove which varies according to an oil pressure;
a secondary pulley on an output side having a groove which varies according to an oil pressure;

a belt wound around the primary pulley and secondary pulley;

a sensor for detecting a vehicle running state; and a controller programmed to:

set a final pulley ratio achieved by a shift of the pulley ratio of the primary and secondary pulleys, based on the vehicle running state, compute a primary steady oil pressure supplied to the primary pulley and a secondary steady oil pressure supplied to the secondary pulley based on an input torque inputted to the primary pulley and an actual pulley ratio, determine a target shift speed based on the final pulley ratio, compute a target stroke speed of the primary pulley and/or secondary pulley from the target shift speed, compute a target pulley rotation speed of the primary pulley, based on the vehicle running state, compute a transitional oil pressure correction amount which can attain the target shift speed, in response to the target pulley rotation speed and the target stroke speed, and set one of the oil pressure supplied to the primary pulley and the oil pressure supplied to the secondary pulley, to the sum of the steady oil pressure and the transitional oil pressure correction amount, so as to attain the final pulley ratio.

6. A control method for controlling a belt type continuously variable transmission, the transmission comprising: a primary pulley on an input side having a groove which varies according to an oil pressure; a secondary pulley on an output side having a groove which varies according to an oil pressure; and a belt wound around the primary pulley and secondary pulley;

the control method comprising:

detecting a vehicle running state;

setting a final pulley ratio achieved by a shift of the pulley ratio of the primary and secondary pulleys, based on the running state;

computing a primary steady oil pressure supplied to the primary pulley and a secondary steady oil pressure supplied to the secondary pulley, according to an input torque inputted to the primary pulley and an actual pulley ratio;

determining a target shift speed based on the final pulley ratio;

computing a target pulley rotation speed of the primary pulley, based on the vehicle running state;

computing a target stroke speed of the primary pulley and/or secondary pulley from the target shift speed;

computing a transitional oil pressure correction amount which can attain the target shift speed, in response to the target pulley rotation speed and the target stroke speed; and setting one of the oil pressure supplied to the primary pulley and the oil pressure supplied to the secondary pulley, to the sum of the steady oil pressure and transitional oil pressure correction amount, so as to attain the final pulley ratio.

* * * * *